March 5, 1935. A. W. STEPHENSON Re. 19,489

MERCURY PRINTING APPARATUS AND PROCESS

Original Filed Oct. 27, 1930

INVENTOR.
Arlington W. Stephenson
BY Miller, Boykin & Brid.
ATTORNEYS.

Reissued Mar. 5, 1935

Re. 19,489

UNITED STATES PATENT OFFICE 19,489

MERCURY PRINTING APPARATUS AND PROCESS

Arlington W. Stephenson, San Francisco, Calif., assignor, by mesne assignments, to The Fax Company, San Francisco, Calif., a corporation of California Original No. 1,854,719, dated April 19, 1932, Serial No. 491,448, October 27, 1930. Application for reissue April 18, 1934, Serial No. 721,243

12 Claims. (Cl. 101—147)

My invention relates to that form of planographic printing in which the printing surface bears an image in mercury amalgamated onto the printing surface to function as a repellent for the printing ink of a roller rolled thereover, and which ink adheres to the non-amalgamated portions of the image or plate.

The objects of my invention are to provide means for automatically replenishing the mercury to the amalgamated portions of the plate as it is gradually carried away through contact of the paper or through other causes. Also such means which is easily applied to any printing press, also which will permit an accurate control of the mercury supplied to the plate and a control of the distribution over various parts of the plate so that the heavier amalgamated portions of the plate will receive correspondingly more mercury than the portions of the image where little or no amalgam is present. Also means whereby the mercury may be kept entirely away from such portions of the printing form to the sides of the mercury plate where plain type or relief cuts are being simultaneously inked and printed. Other objects of the invention will appear in the following description and accompanying drawing.

Before describing the apparatus attention is called to the fact that while various modifications of mercury printing plates have been invented over a period of many years, these are chiefly concerned with the production of the amalgamated surface on the dots or lines constituting the non-printing parts of the image, means for making it more resistant, overcoming tendency to spreading or creeping of the amalgam in the copper plates or copper plated plates on which the amalgamated image is formed, and but little has been done insofar as is known to your applicant, in regard to replenishing the mercury, except to bathe the plate in mercury after every dozen or two impressions, or mix a certain amount of mercury directly into the printing ink so that it is carried from the fountain over the ink rollers in the form of minute globules to attach itself to the amalgamated portions of the plate as the ink roller rolls thereover.

The first proposed method of bathing or swabbing the plate with mercury is impracticable, and the second method entails a great waste of mercury as it is distributed everywhere throughout the ink mass and its proportion relative thereto with respect to different portions of the plate or printing form cannot be varied.

I overcome the objections above noted by providing a special mercury fountain arranged to feed a controlled quantity of mercury directly upon the sticky surface of an ink roller positioned between the ink fountain of the press and the form inking rollers, and which fountain is adjustable to supply any required amount of mercury at various points along the form, or shut off the supply entirely from those parts of the form where none is desired.

Since my apparatus may be applied to any style of printing press and such presses are legion, the apparatus is indicated in the drawing as mounted over the ink distributing rollers of a platen press and with just so much of the common press elements shown as to make it clear and understandable.

In the drawing, Fig. 1 is a side elevation of my mercury fountain applied to a platen press and intermittent actuation of the mercury feed to deposit the globules upon one of the ink rollers.

Figure 1:
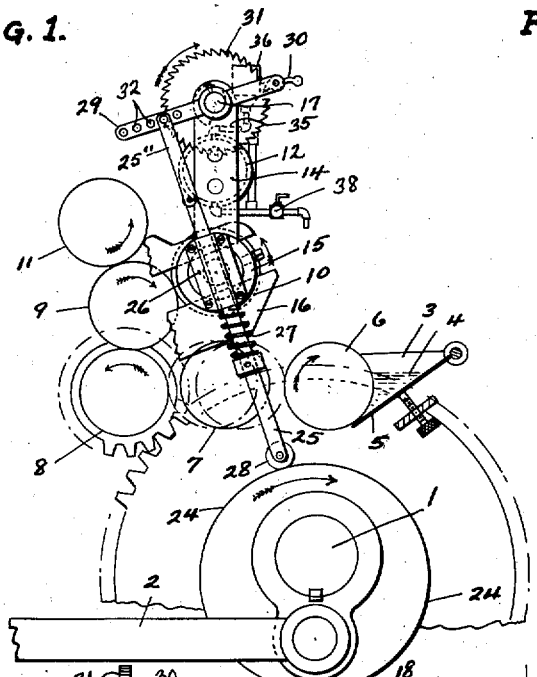

In further detail, 1 is the crank shaft of a platen press, 2 one of the cranks which operates the platen (not shown), 3 the ink fountain, 4 the ink in the fountain, 5 the distributing blade, 6 the fountain cylinder, 7 the ductor roller, 8, 9, 10 and 11 several of the distributing ink rollers of which there may be any number and of any desired arrangement preceding the form rollers (not shown), all of which is well understood in the art, and hence is not further described or illustrated herein.

My apparatus comprises a special mercury fountain or mercury feed control arranged adjacent one of the ink rollers so that globules of mercury may be fed thereto, and in the present drawing the fountain comprises a mercury reservoir in the shape of a pipe 12 extending horizontally across the press above ink roller 10, which in this particular case is an extra roller inserted into the distributing organization.

Pipe 12 is closed at its ends by caps 13 and is supported on brackets 14 in turn provided with hubs 15 supported on portions 16 of the press frame and forming in the present instance bearings for ink roller 10 which is an idler driven by contact with roller 9.

Figure 3:
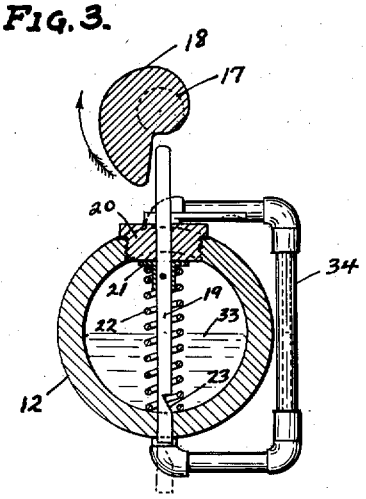
Fig. 3 is an enlarged cross section of the fountain taken through the line 3—3 of Fig. 2.
Figure 2:
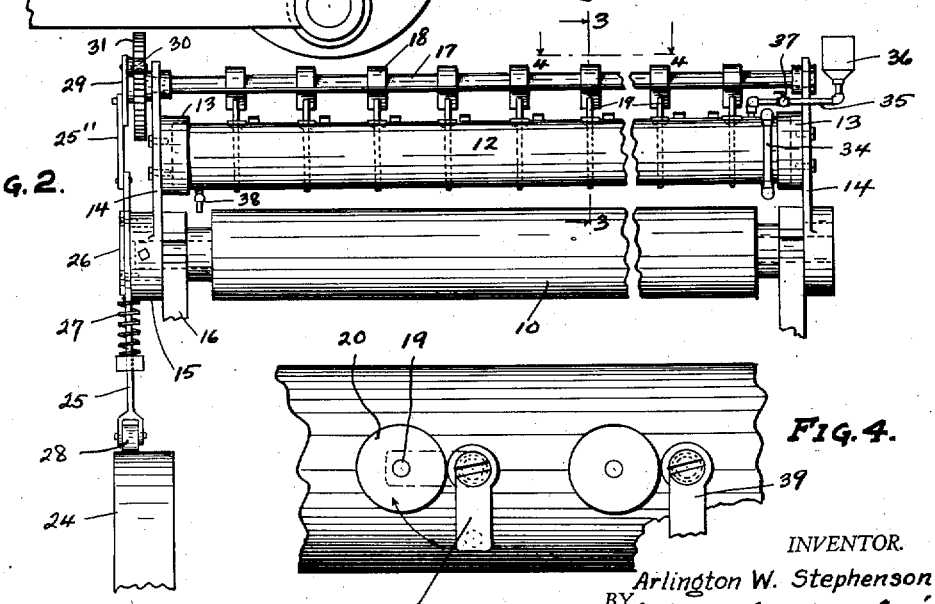
Fig. 2 is a front view of the fountain and the ink roller below which receives the mercury globules.
Figure 4:
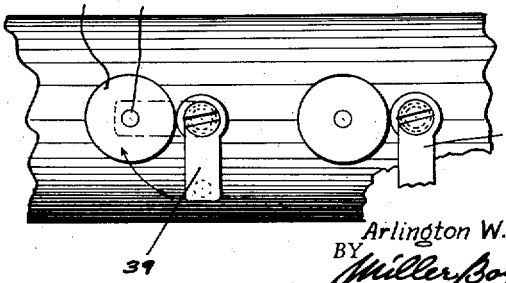
Fig. 4 is an enlarged plan view of a portion of the fountain as seen from the line 4—4 of Fig. 2.

Extending along and above pipe 12 is a small shaft 17 rotatably supported in upward extensions of brackets 14 and carrying a series of small cams 18 secured thereto, each cam being positioned above a mercury discharge valve stem 19 slidably extending in a vertical direction through pipe 2 as best shown in Fig. 3 wherein the stem passes through a nut 20 screwed to the pipe and carries a small collar 21 below the nut against which bears a small coiled spring 22 resiliently forcing the stem upward unless pushed down by one of the cams 18 above it.

The stems 19 extend entirely through the pipe so as to close the openings either against evaporation of mercury from above or leakage of mercury below, and each stem is formed with a beveled notch 23 near its lower end so that in alternate vertical movements of the stem by cam 18 and spring 22 the notch will pass in and out of the pipe to discharge a very small quantity of mercury each time it comes below the pipe and drop the globule to the ink covered roll 10 below.

As it has been found sufficient in practice to feed a little mercury to the rolls at intervals between ten and twenty impressions printed, means for intermittently turning the cam shaft 17 by the action of the press is provided in an adjustable ratchet device operated from a cam 24 on the main shaft 1 which in revolving raises and lowers a push rod 25 slidable in a guide 26 on the end of one hub 15, the rod being resiliently urged downward by a spring 27 to force its roller 28 against the cam, and the upper end of the rod linked at 25'' to a ratchet arm 29 pivoted freely on the end of shaft 17 and carrying a pivoted pawl 30 arranged to engage the teeth of a ratchet wheel 31 secured to the shaft, so that upon each lifting of rod 25 the ratchet and hence the shaft 17 will be given a fractional turn of a magnitude depending on the setting of the link 25'' at various points along the ratchet arm in holes 32.

In use, the fountain pipe 12 is filled about half or three-quarters full with liquid mercury 33 as denoted on a sight gage glass 34, the introduction of mercury being conveniently accomplished through a small pipe 35 equipped with a funnel or reservoir 36 at its outer end and a shut-off cock at 37. Also provided is a drain cock 38 for emptying the fountain when desired.

It is to be understood that the mercury discharge valves 19 may be spaced quite close together so that the ejected globules fall in a close row, also that as soon as they fall they are ground or sub-divided into invisible globules as they pass from one ink roller to the other and are evenly distributed by the action of the rollers of the ordinary ink distributing system, one or more of which rollers has reciprocatory movement as is well understood, all so that by the time the mercury reaches the form rollers it is divided into minute globules in the ink and applied to the plate therewith.

Any one or more of the mercury valves may be rendered inoperative by simply pushing its stem 19 down and turning a small pivoted button 39 over it to hold it down so that its cam can no longer act upon it. Thus the mercury feed to the right and left of the mercury plate or cut may be shut off, and if desired intermediate valves may be shut off to vary the distribution on the plate itself.

It should be noted that when the mercury globules fall from the fountain or valves, they are at once caught by the sticky ink which covers the roller 10 and cannot bounce away or get lost, also, since they are not mixed with the ink in the ink fountain there is no waste of mercury, and besides the control of the mercury is entirely independent of the control of the ink. The latter feature being of greatest importance since where most ink is required on the printing plate (the deep shadows) little or no mercury is required, whereas in the white portions of the picture the greatest amount of mercury is required to maintain the amalgamated surface fresh and repellent, and little or no ink is needed.

In considering the above invention it will be seen that the important feature of the mercury feed is the provision of a movable device formed with a small notch or depression which carries a small quantity of mercury from the reservoir to discharge it therefrom when the notch or depression is moved in and out of the reservoir.

Having thus described my invention and its advantages it will be evident from the nature of the apparatus and the almost unlimited variations in printing press structure to which it is applicable that many changes in details of construction may be made without departing from the spirit of the invention and therefore I claim:

1. In a printing press provided with inking rolls, means for feeding mercury to the rolls preparatory to inking the form therewith, and means for operating the mercury feeding means independently of the ink supply.

2. In a printing press provided with inking rolls, means for feeding mercury to the rolls preparatory to inking the form therewith, and means for operating the mercury feeding means by the operation of the press.

3. In a printing press provided with inking rolls, means for feeding mercury to the rolls preparatory to inking the form therewith, and means for operating the mercury feeding means intermittently by the operation of the press.

4. In a printing press provided with inking rolls, means for dropping globules of liquid mercury to the rolls preparatory to inking the form therewith.

5. A mercury fountain for printing presses, comprising a row of mercury ejectors, means for supplying liquid mercury to the ejectors, means for operating the ejectors comprising a cam for tripping the ejector, and variable ratchet means for operating the cam.

6. In a printing press, a mercury fountain comprising a reservoir for the mercury provided with an opening for discharge of the same, a member seated against said opening sealing the same, a depression in said member and means for moving the member relative to the fountain to bring said depression in and out of the reservoir for conveying a small portion of mercury therefrom, said member formed with a curved surface, and said depression formed in said curved surface.

7. In a printing press provided with inking rolls, means for feeding mercury to said rolls comprising a reservoir for mercury, a reciprocable valve stem extending though the lower part of the reservoir, means for reciprocating the stem, and a notch in said stem arranged to pass from within to without the reservoir so as to carry a globule of mercury out with it upon outward movement of the notch.

8. In a printing press provided with inking rolls, means for feeding mercury to said rolls comprising a horizontally extending pipe, a row of orifices in the bottom of said pipe, a row of valve stems slidably mounted in said orifices, each stem notched so that upon sliding the notch will move past the wall of the pipe and thereby drop a globule of mercury from the reservoir.

9. In a printing press provided with inking rolls, means for feeding mercury to said rolls comprising: a reservoir adapted to hold a supply of mercury; a movable member having a depression arranged and adapted to be brought into and out of the mercury to carry therefrom a small quantity of mercury and convey it out of the reservoir upon such movement.

10. In a printing press provided with inking rolls, means for feeding mercury to said rolls comprising: a mercury reservoir; a member movable relative to the reservoir and forming a seal against discharge of mercury from said reservoir; a depression in said member adapted to receive a small quantity of mercury; and means causing relative movement between said member and said reservoir for bringing said depression into and out of the reservoir and thereby carrying said small quantity of mercury out of the reservoir and discharging it therefrom.

11. In a printing press provided with inking rolls, means for feeding mercury to said rolls comprising: a reservoir for the mercury provided with an opening for discharge of the same; a member seated against said opening and sealing the same; a depression in said member and means for moving the member relative to the fountain to bring said depression in and out of the reservoir for conveying a small portion of mercury therefrom.

12. In a printing press provided with an inking roll, means for feeding small globules of mercury to said roll in a predetermined spaced relation, said means comprising a mercury reservoir disposed longitudinally adjacent the roll and means for shearing small globules of mercury from said reservoir and dropping them on said roll.

ARLINGTON W. STEPHENSON.